March 23, 1965
A. G. LLOYD
3,175,167
DIRECT-CURRENT TO ALTERNATING-CURRENT SATURABLE CORE INVERTERS
Filed July 27, 1961
5 Sheets-Sheet 1
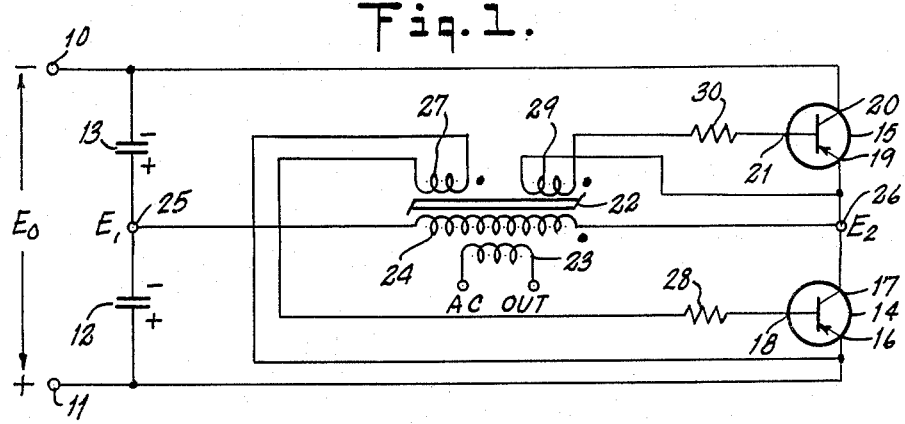
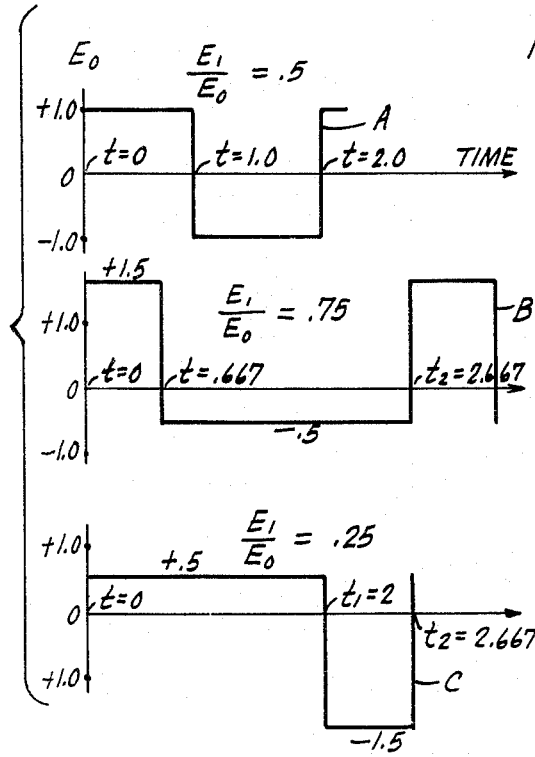
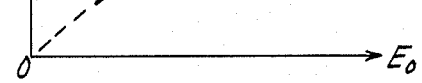
INVENTOR.
ALLAN G. LLOYD
BY John A. Harvey
ATTORNEY March 23, 1965     A. G. LLOYD     3,175,167
DIRECT-CURRENT TO ALTERNATING-CURRENT SATURABLE CORE INVERTERS
Filed July 27, 1961

INVENTOR.
ALLAN G. LLOYD
BY John A. Harvey
ATTORNEY

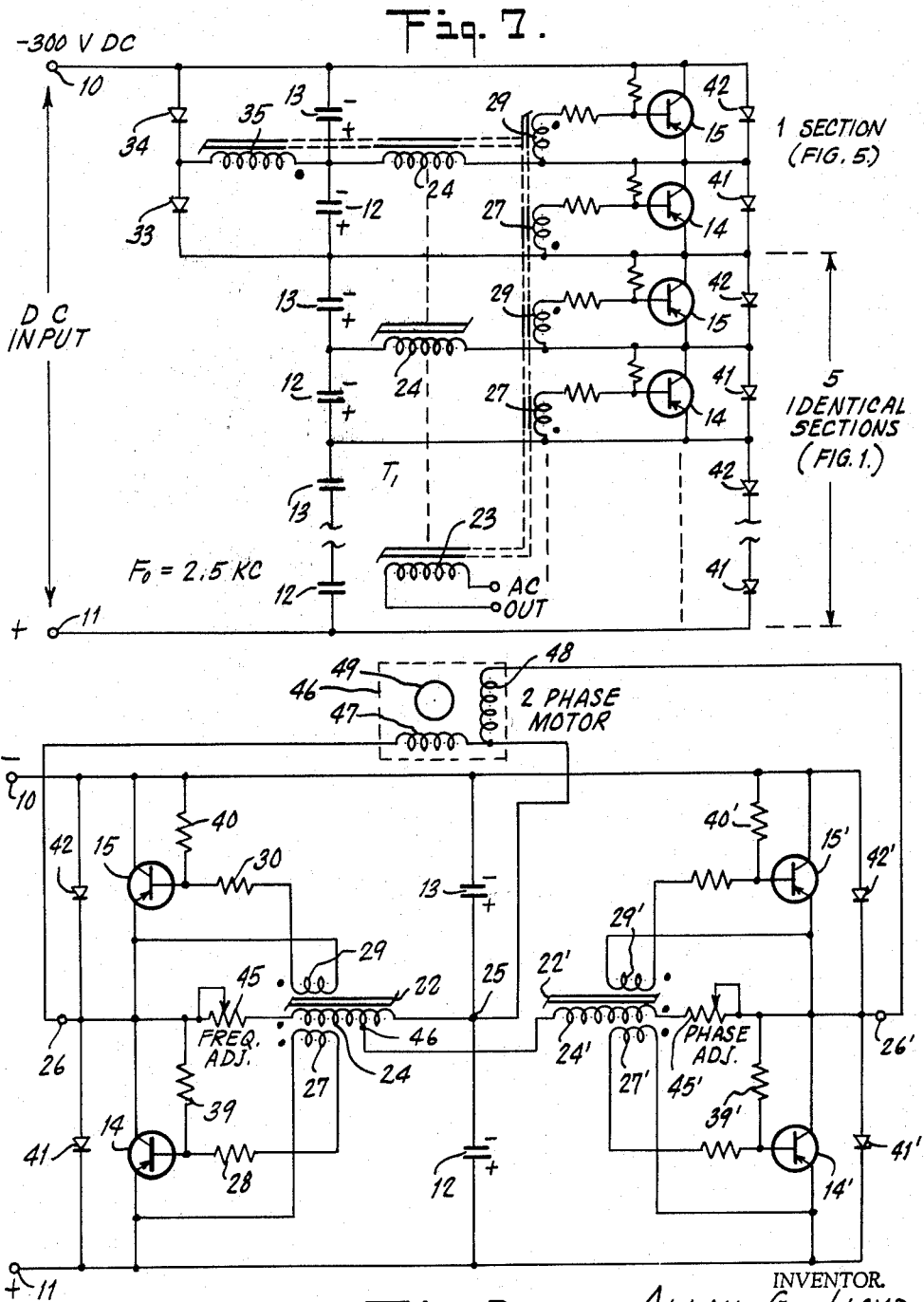

INVENTOR.
ALLAN G. LLOYD
BY John Q. Harvey
ATTORNEY

March 23, 1965  A. G. LLOYD  3,175,167
DIRECT-CURRENT TO ALTERNATING-CURRENT SATURABLE CORE INVERTERS
Filed July 27, 1961  5 Sheets-Sheet 5

INVENTOR.
ALLAN G. LLOYD
BY
John A. Harvey
ATTORNEY

United States Patent Office 3,175,167
Patented Mar. 23, 1965

3,175,167
DIRECT-CURRENT TO ALTERNATING-CURRENT SATURABLE CORE INVERTERS
Allan G. Lloyd, Newark, N.J., assignor, by mesne assignments, to General Mills, Inc., Minneapolis, Minn., a corporation of Delaware
Filed July 27, 1961, Ser. No. 127,336
1 Claim. (Cl. 331—113)

The present invention relates to direct-current to alternating-current inverters utilizing only passive electrical components. While the invention has utility in numerous and diverse applications, it has particular utility in the transistorized form of inverter and will be described in that connection.

It is often desirable to transform a unidirectional voltage to an alternating voltage which may then be used to energize alternating-current machines and equipments or which may be suitably rectified and filtered to provide a unidirectional voltage of different value than that of the unidirectional energizing source. Numerous forms of inverters utilizing passive electrical components have been proposed for this purpose, but these have usually been constructed to accomplish a particular desired operational result and by reason of this are ordinarily not suitable for use in any application other than that for which they are designed. This, of course, limits their range of utility and in general has necessitated the construction of particular inverter configurations for particular applications. It is an object of the present invention to provide a new and improved direct-current to alternating-current inverter and one which has a construction and characteristic mode of operation which render it suitable for use in numerous and diverse applications.

It is a further object of the invention to provide a novel direct-current to alternating-current inverter of simplified circuit arrangement requiring a minimum number of circuit components.

It is an additional object of the invention to provide a new and improved direct-current to alternating-current inverter having a modular circuit configuration which enables multiple modular constructions of various modular arrangements to be utilized in providing numerous and diverse forms of inverter arrangement as desired for particular applications.

It is yet a further object of the invention to provide a new direct-current to alternating-current inverter of the transistorized form, and one capable of readily attaining large ratios of unidirectional voltage to alternating voltage while at the same time exhibiting improved operational characteristics.

It is an additional object of the invention to provide a novel direct-current to alternating-current inverter which may readily be constructed to provide either two phase or three phase alternating voltages as desired in a particular application.

Other objects and advantages of invention will appear as the detailed description thereof proceeds in the light of the drawings forming a part of this application and in which:

FIG. 1 is a circuit diagram representing a direct-current to alternating-current inverter embodying the present invention in a particular form, FIGS. 2, 3, and 4 graphically representing certain operating characteristics of the FIG. 1 inverter and are used as an aid in explaining its operation;

FIG. 7 is a circuit diagram of an inverter embodying the present invention in yet another form particularly suitable for those applications in which it is desired that the alternating output voltage of the inverter have relatively large ratio to the value of unidirectional energizing voltage;

FIG. 8 represents an inverter embodying the present invention in yet another form suitable for generating a two-phase alternating-current output in which the alternating output voltages have 90° phase displacement;

Figure 9:
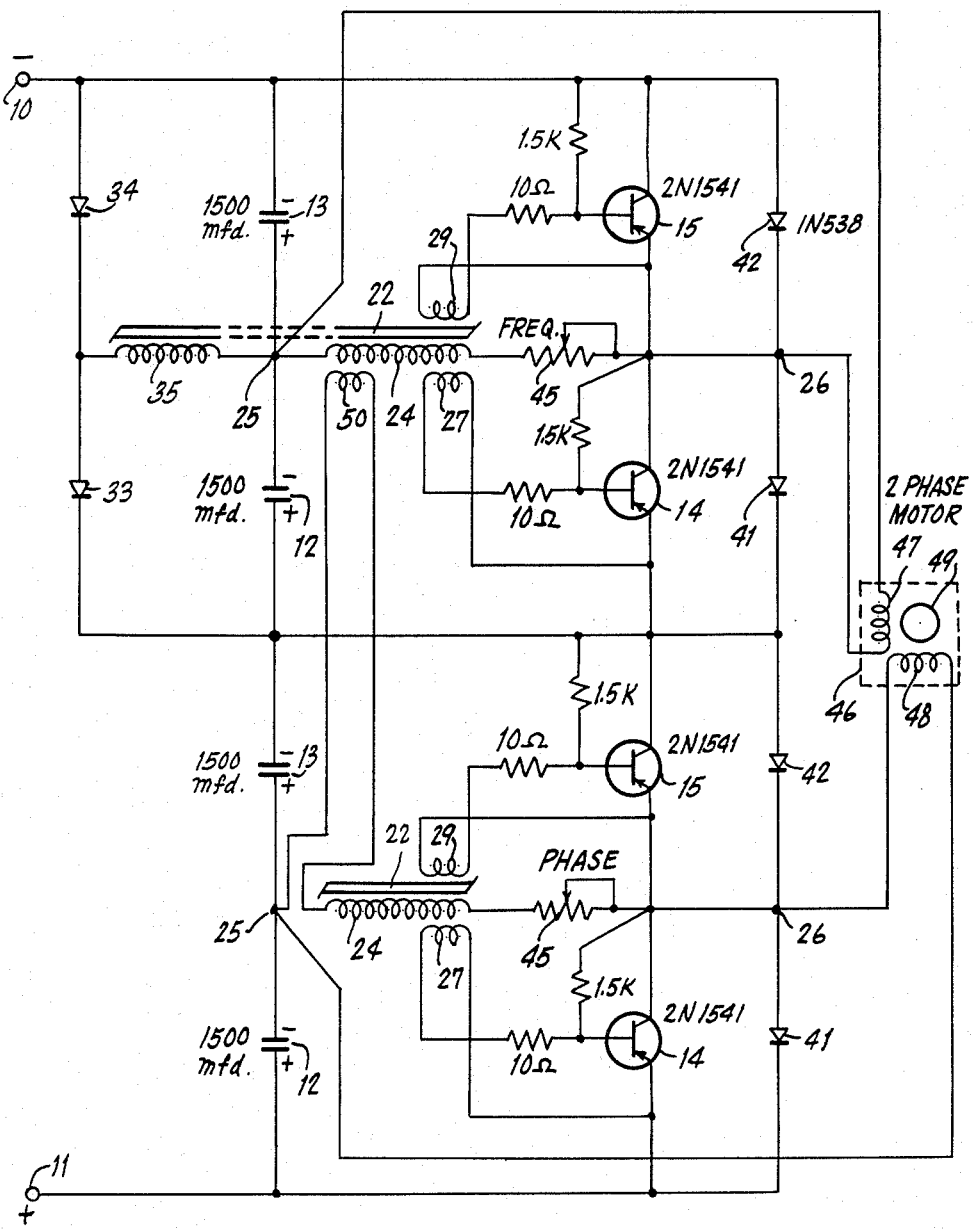
Figure 10:
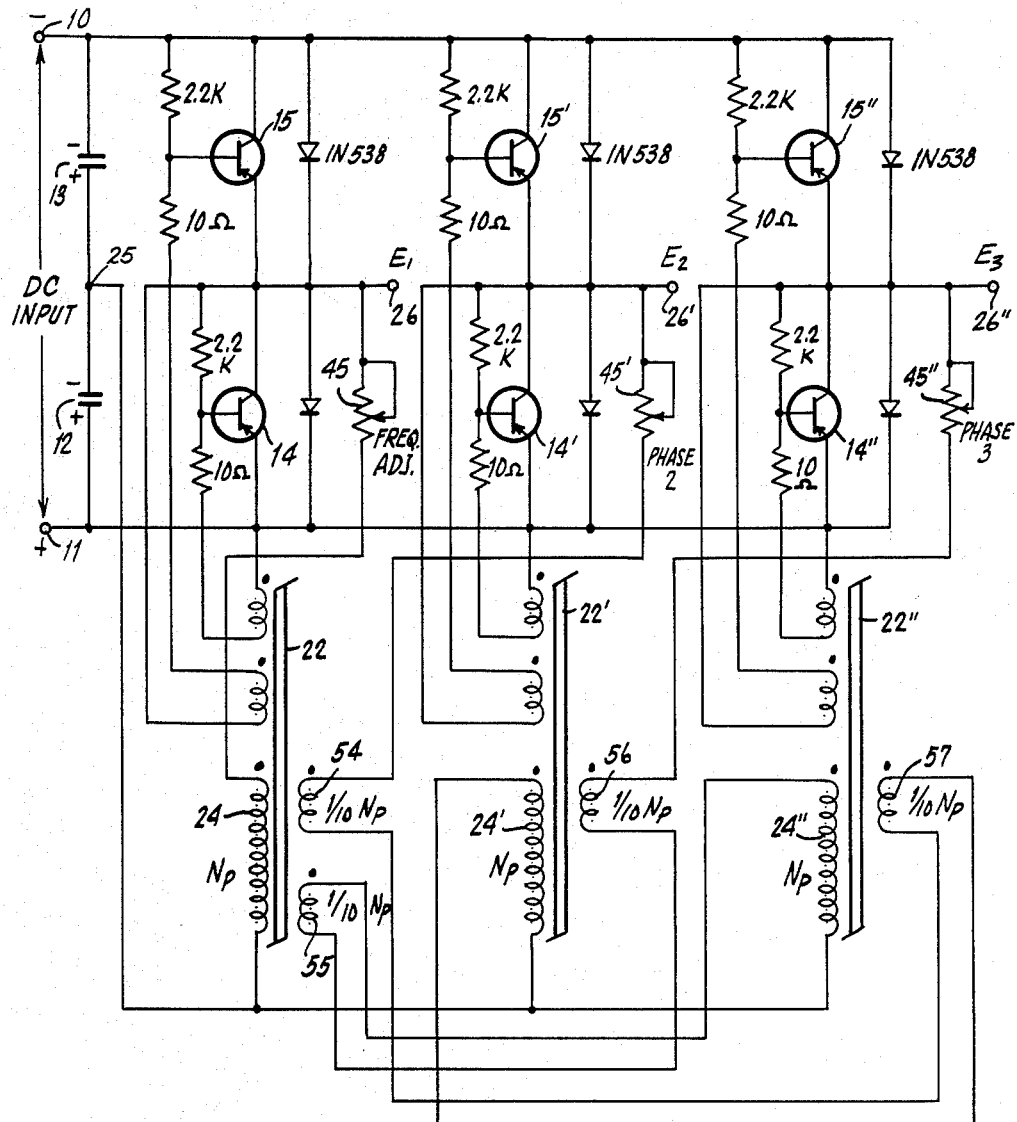
Figure 11:
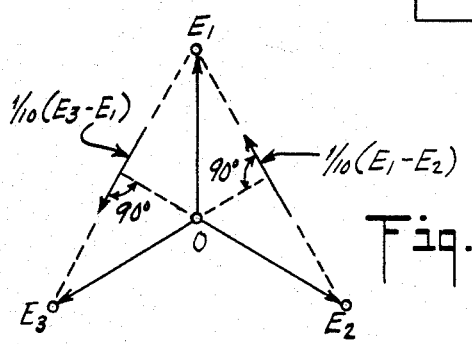

FIG. 9 is a circuit diagram of an additionally modified form of invention which likewise generates quadurature-phase-displaced alternating voltage outputs; and FIG. 10 is a circuit diagram of an inverter embodying the invention in a form suitable for generating a three-phase alternating voltage output, FIG. 11 graphically representing voltage relationships present in the FIG. 10 arrangement and being used as an aid in explaining its operation.

Referring now more particularly to FIG. 1 of the drawings, a direct-current to alternating-current inverter embodying the present invention in simple form includes an input circuit comprising input terminals 10 and 11 adapted to be energized with unidirectional power from a source not shown. A pair of equal-valued condensers 12 and 13, preferably of relatively large capacitance, are serially connected across the input circuit 10, 11. A pair of unidirectional conductance control devices 14 and 15 are also serially connected, with like directions of conductivity, across the input circuit 10, 11. The devices 14 and 15 are shown by way of example as comprised by transistors, the device 14 having an emitter terminal 16 and a collector terminal 17 with a base terminal 18 which cooperates with the emitter terminal 16 to provide conductance-control terminals effective to control the conductivity of the device 14 between its emitter terminal 16 and its collector terminal 17. The device 15 similarly includes an emitter terminal 19, a collector terminal 20, and a base terminal 21 which with the emitter terminal 19 comprises conductance-control terminals controlling the conductance of the device 15. The inverter includes a saturable core output transformer 22 having a winding 23 providing an alternating-current output circuit for the inverter and having an energizing winding 24 which is connected between the junction point 25 of the condensers 12 and 13 and the junction point 26 of the devices 14 and 15. The transformer 22 also includes a control winding 27 which is connected through a current limiting resistor 28 between the base terminal 18 and the emitter terminal 16 of the conductance control device 14, and includes a similar control winding 29 which is connected through a current limiting resistor 30 between the base terminal 21 and the emitter terminal 19 of the conductance control device 15. The regenerative-phase polarities of the windings 24, 27 and 29 are indicated in conventional manner by dots placed at one end of each of these windings.

Considering now the operation of the FIG. 1 inverter, assume that upon initial energization of the input circuit 10, 11 the transistor 14 becomes conductive prior to any appreciable conductivity of the transistor 15. Under this assumed condition, current is conducted by the transistor 14 from the input terminal 11 to the junction point 26, through the energizing winding 24 of the output transformer 22 to the junction point 25, anl through the condenser 13 to the input terminal 10. The current thus conducted through the energizing winding 24 induces control voltages in the control windings 27 and 29 having such polarities that the voltage applied between the base terminal 18 and the emitter terminal 16 of the transistor 14 tends to render the latter more fully conductive whereas the voltage applied between the base terminal 21 and emitter terminal 19 of the transistor 15 tends to render this transistor less conductive. This control action is cumulative, and rapidly renders the transistor 14 fully conductive and the transistor 15 non-conductive.

The output transformer 22 is of the saturable core type in which the magnetic flux produced in the core increases at relatively constant rate to a maximum value at which the core is fully magnetically saturated in one magnetic polarity. During this interval a constant amplitude pulse voltage is developed in each of the control windings 27 and 29 of the transformer 22, and these pulse voltages maintain the transistor 14 fully conductive and the transistor 15 non-conductive. The current flowing through the energizing winding 24 flows through the condenser 13 during this interval to charge the latter with the polarity indicated in the drawing.

As soon as the core of the transformer 22 reaches magnetic saturation, the magnetic flux in its core no longer increases as before and the amplitudes of the pulse control voltages developed in the control windings 27 and 29 of the transformer 22 now decrease to reduce the conductivity of the transistor 14 which in turn reduces the energization of the transformer winding 24. This action is cumulative to effect a reversal of polarity of the voltages developed in the control windings 27 and 29. The reverse polarity control voltage thereupon applied between the base electrode 18 and emitter electrode 16 of the transistor 14 causes this transistor to become non-conductive whereas the reverse polarity pulse voltage applied between the base terminal 21 and emitter terminal 19 of the transistor 15 causes the latter to become fully conductive. Current now flows from the input terminal 11 through the condenser 12 to the junction point 25, through the transformer energizing winding 24 to the junction point 26, thus flowing in opposite direction through this winding to that in which it formerly flowed, and from the junction point 26 through the transistor 15 to the input terminal 10. The energizing current now flowing through the energizing winding 24 produces a magnetic field in the transformer core of opposite magnetic polarity to that previously developed, and the field accordingly begins to increase the constant rate until the core saturates in the opposite polarity of magnetic saturation. While this occurs, control voltages of constant amplitude are developed in the control windings 27 and 29 to maintain the transistor 15 fully conductive and the transistor 14 non-conductive. During this interval also, the current flowing through the energizing winding 24 charges the condenser 12 with the polarity indicated.

As soon as the core of the transformer 22 attains magnetic saturation in opposite magnetic polarity, the control voltages developed in the control windings 27 and 29 again reverse polarity to render the transistor 14 fully conductive and the transistor 15 non-conductive. Current is accordingly once more conducted through the transistor 14, the energizing winding 24, and the condenser 13 in the manner initially considered until reversal of the polarity of magnetic saturation of the core of the transformer 22 is again effected. It will be apparent from this that the inverter is self-oscillatory, whereby the transistors 14 and 15 in being rendered alternately and successively conductive energize the energizing winding 24 of the transformer 22 with current alternately conducted by the transistors 14 and 15. The condensers 12 and 13 preferably have sufficiently large, and equal, values of capacitance that their steady state operational terminal voltages do not change significantly during a half cycle of inverter operation.

The oscillatory character of operation of the inverter theoretically should result in a value of current flow through the condenser 12 and transistor 15 equal to that which flows through the condenser 13 and transistor 14, so that the terminal charge voltage of the condenser 12 should equal the terminal charge voltage of the condenser 13. For this theoretical condition, the voltage $E_1$ of the junction point 25 with respect to either the input terminal 10 or the input terminal 11 should have a value equal to one half the value of the input energizing voltage $E_0$. For this theoretical operating condition, the control voltages developed in the control windings 27 and 29 of the transformer 22 would have symmetrical pulse wave form as represented by a curve A of FIG. 2 with positive and negative polarities of equal time durations. In practice, however, permissible tolerances in the values of the electrical components used in the inverter and differences in the operational characteristics of the transistors 14 and 15 may result in an average value of current flow through the condenser 12 larger than that which flows through the condenser 13, or vice versa. Thus the terminal charge voltages of the condensers 12 and 13 may become unequal during steady state operation of the inverter.

The value of the voltage $E_1$ of the junction point 25 may accordingly acquire, with respect to a selected one of the input terminals 10 or 11, a value approaching that of the input energizing voltage $E_0$ or may acquire with respect to the selected input terminal a value appreciably less than one-half of the value of the input voltage $E_0$. Curve B of FIG. 2 graphically represents the pulse wave form of the control voltage developed in one of the transformer windings 27 or 29 for an assumed operational condition that the value of the voltage $E_1$ of the junction point 25 is 75% of the value of the input energizing voltage $E_0$. The control voltage for this condition now has a larger positive amplitude and a shorter positive polarity duration and has a smaller negative amplitude and prolonged negative polarity duration, and these changes are accompanied by a prolonged cyclic period of oscillation of the inverter as indicated by the values applied to curve B. Conversely if the value of the voltage $E_1$ of the junction point 25 is assumed to have a value approximately one-fourth of the value of the input energizing voltage $E_0$, the control voltage developed in either of the control windings 27 and 29 of the transformer 22 has positive and negative pulse amplitudes and durations just the reverse of that previously described, as represented by curve C of FIG. 2, and likewise results in a prolonged cyclic period of oscillation of the inverter. The reason for this change of control voltage pulse wave form is related to two factors. The first of these is the difference prevailing between the value $E_1$ of the voltage at the junction point 25 and the value $E_2$ of the voltage at the junction point 26, the latter voltage differing from the voltage of the input terminal 11 only by the internal voltage drop of the transistor 14 during the conductive state of this transistor or differing from the voltage of the input terminal 10 only by the internal voltage drop of the transistor 15 during the conductive state of the latter. The second factor concerns the fact that the saturable core of the transformer 22 exhibits for well known reasons a constant value of volt-seconds per half cycle of transformer excitation and by reason of which the voltage induced in the transformer windings has an amplitude and duration of given polarity such that the product of the maximum induced amplitude and period of one-half cycle of system operation is equal to a constant of value K. This leads to the following mathematical relation between the frequency of self oscillation of the inverter and the value $E_1$ of the voltage at the junction point 25 with respect to the value $E_0$ of the input energizing voltage:

$$F = \frac{1}{t} = \frac{1}{t_1 + t_2} = \frac{1}{\frac{K}{E_0 - E_1} + \frac{K}{E_1}}$$

where $K=$ a constant
$F=$ frequency of inverter self oscillation
$t=$ period of one cycle of the inverter self oscillation
$t_1=$ period required for the transformer core to change from one polarity of magnetic saturation to the opposite polarity of magnetic saturation $t_2$ = period required for the transformer core to change from the opposite polarity of magnetic saturation to the one polarity of magnetic saturation $E_0$ = value of input energizing potential $E_1$ = value of potential at the junction point 25 with respect a selected one of the input terminal 10 or 11 which normalizes to:

$$F = 4a(1-a)F_{max} \quad (2)$$

where $$a = \frac{E_1}{E_0} \quad (3)$$

and $$F_{max} = KE_0$$

Equation 2 is the equation of an inverted parabola as graphically shown in FIG. 3, which makes evident the fact that the present inverter may by specific control of the value of the ratio $E_1/E_0$ provide a voltage-to-frequency squaring characteristic as may be desirable in certain applications. FIG. 4 graphically shows that the frequency of self oscillation of the inverter is directly proportional to the value of input energizing voltage $E_0$ for a given fixed ratio of the value of the voltage $E_1$ to the input voltage $E_0$.

Figure 5:
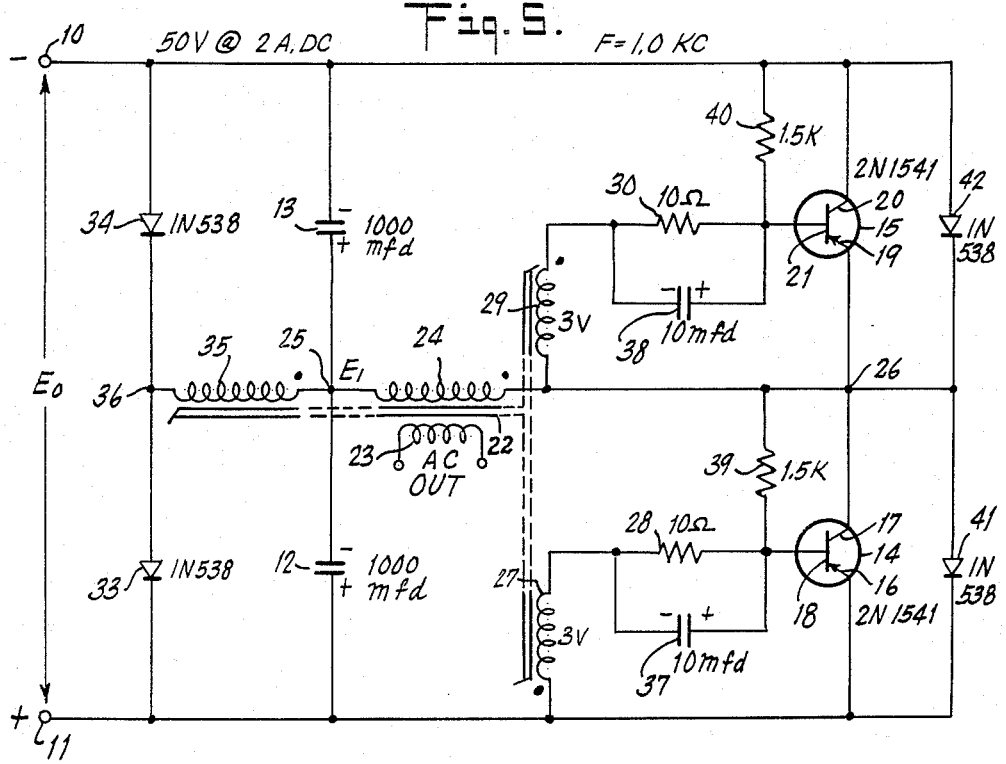
FIG. 5 is a circuit diagram of a direct-current to alternating-current inverter embodying the invention in modified form, FIG. 6 graphically representing certain operating characteristics of the FIG. 5 inverter.

FIG. 5 is a circuit diagram of an inverter embodying the present invention in a form essentially similar to that of FIG. 1, similar circuit components being identified by similar reference numerals. In the present inverter arrangement, the charge voltages developed across the terminals of the condensers 12 and 13 are maintained substantially equal by the provision of a pair of diode rectifiers 33 and 34 serially connected with like directions of conductivity but with non-conductive polarities across the input circuit 10, 11 and by the provision on the transformer 22 of a winding 35 which is connected between the junction point 25 and the junction point 36 of the rectifiers 33 and 34. The winding 35 has a sufficient number of turns that the induced voltage developed in this winding is approximately one volt in excess of the voltage impressed upon the energizing winding 34, this excess being approximately equal to the internal voltage drop of the rectifier devices 33 or 34 in their conductive state. The voltages developed across the condensers 12 and 13 tend to maintain the respective diode rectifiers 33 and 34 non-conductive so long as the charge voltages of the condensers 12 and 13 are equal. However, should the charge voltage of the condenser 12 tend to become larger than that of the condenser 13, the relatively low value of emitter-collector impedance of the transistor 14 in its conductive state impresses the higher terminal voltage of the condenser 12 across the primary winding 24 and induces an equally higher voltage in the winding 35 each conductive interval of the transistor 14. This higher voltage induced in the winding 35 has additive polarity with respect to the charge voltage of the condenser 12 so that for this conductive interval of the transistor 14 the sum of the voltages of the winding 35 and condenser 12 exceeds the input voltage $E_0$ and the net value of excessive voltage renders the rectifier device 34 conductive. Thus the rectifier device 34 rapidly reduces the charge of the condenser 12 by current flow from the input terminal 10 through the rectifier device 34, the transformer winding 35, and the condenser 12 to the input terminal 11. Conversely, should the charge voltage of the condenser 13 tend to exceed that of the condenser 12, the rectifier device 33 is similarly rendered conductive by the voltage induced in the winding 35 during a conductive interval of the transistors 15 and reduces the charge of the condenser 13 by current flow from the input terminal 10 through the condenser 13, the transformer winding 35, and the rectifier device 33 to the input terminal 11. By reason of this character of operation, the value $E_1$ of the voltage at the junction point 25 is maintained at an average value substantially equal to one half of the input energizing voltage $E_0$. This results, for reasons explained in connection with FIG. 1, in equal intervals of alternate conductivity of the transistor devices 14 and 15 and has the effect that the frequency of self-oscillation is maintained substantially constant for reasons pointed out in connection with FIG. 3.

The inverter of FIG. 5 also includes a condenser 37 connected in shunt to the current limiting resistor 28 and a condenser 38 connected in shunt to the current limiting resistor 30, these condensers serving to increase the rapidity with which the transistors 14 and 15 change between their conductive and non-conductive states under control of the control voltages developed in the windings 27 and 29 of the transformer 22. A resistor 39 is connected between the collector electrode 17 and the base electrode 18 of the transistor 14, and a resistor 40 is similarly connected between the collector electrode 20 and base electrode 21 of the transistor 15 to assist in initiating an oscillatory state of the inverter system each time that it is energized by application of unidirectional power to the input circuit terminals 10 and 11. A diode rectifier device 41 is connected between the emitter electrode 16 and the collector electrode 17 of the transistor 14, and a diode rectifier device 42 is similarly connected between the emitter electrode 19 and collector electrode 20 of the transistor 15. The devices 41 and 42 are connected with non-conductive polarities with respect to the polarity of the input circuit 10, 11, and serve to prevent the application of any reverse voltage transients between the emitter and collector electrodes of their associated transistor. The operation of the present inverter is essentially similar to that previously described in connection with FIG. 1, but with the difference previously noted that the rectifier devices 33 and 34 and the transformer winding 35 operate to maintain substantial equality between the charge voltages of the condensers 12 and 13.

Figure 6:
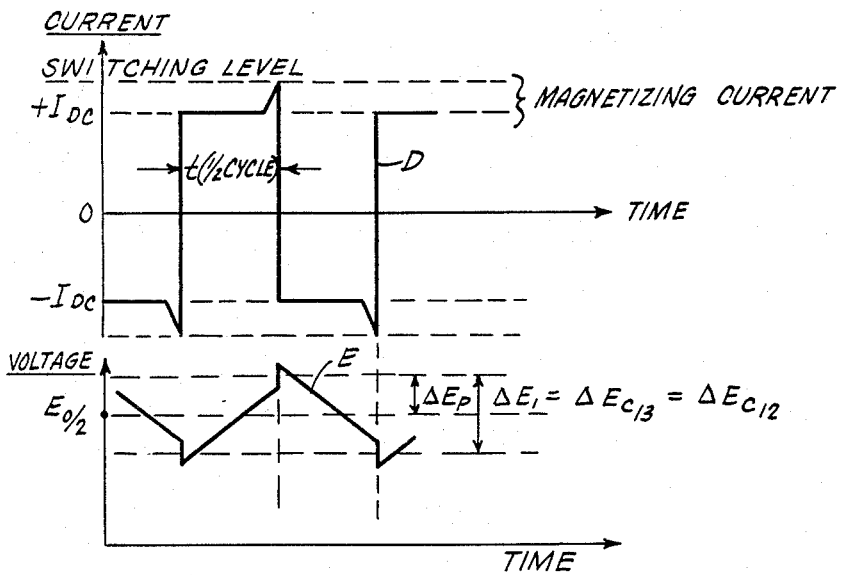

In the FIG. 5 inverter, a suitable value for the condensers 12 and 13 is a compromise between the condenser size and the approach to attainment of a rectangular wave form for the generated output alternating voltage. Curve D of FIG. 6 graphically represents the wave form of the current flowing through a selected one of the condensers 12 or 13, and curve E of FIG. 6 represents a resultant instantaneous value of the voltage $E_1$ which might prevail at the junction point 25 for a given value of the condensers 12 and 13. If it is assumed that the values of the condensers 12 and 13 are sufficiently large as to make the average range of instantaneous voltage changes of the voltage $E_1$ small in comparison with the input energizing voltage $E_0$, then the current wave form of the current flowing through the condensers 12 and 13 will be essentially rectangular as represented by curve D with a maximum value $I_{DC}$ and the wave form of the voltage changes at the junction point 25 will be triangular with a peak value given by the mathematical relation:

$$E_p = \frac{I_{DC}t}{2C} \quad (5)$$

where $C$ = the value of the capacitance of either of the equal valued condensers 12 and 13.

It can readily be shown by use of Equation 5 that condensers 12 and 13 having a value of 1000 microfarads will maintain the peak voltage change at the junction point 25 at one-half volt or less for an inverter self oscillatory frequency of 1000 cycles per second and a value of $I_{DC}$ equal to 2 amperes.

As will presently become more evident, the inverter arrangements of FIGS. 1 and 5 are of modular circuit configuration enabling multiple modular constructions to be utilized in providing numerous and differing forms of inverter having individual characteristic modes of operation and accomplishing individual operational results.

FIG. 7 is a circuit diagram of such multiple modular arrangement having six inverter modules electrically connected in series for energization by a unidirectional energizing source of relatively large voltage of the order of 300 volts. The output transformer of the present arrangement includes 6 identical energizing windings 24 of which one is included in each module or section inverter, includes 12 transistor control windings 27 and 29 of which two are used in each module or section inverter, includes one symmetry voltage winding 35 used only in the upper module or section having the FIG. 5 configuration, and has one or more output windings 23 as desired. The symmetry voltage winding 35 operates as described in relation to FIG. 5 to maintain substantially constant the self-oscillatory frequency of the upper module by maintaining substantial equality between the conductive intervals of its transistors 14 and 15, and this frequency control is imposed upon the lower five modules by reason of the common output transformer construction last described. The lower five modules or sections of the present arrangement have the circuit configuration shown in FIG. 1 but with the addition of transient voltage protective diode rectifiers 41 and 42 used in the manner and for the same purpose as explained in connection with the FIG. 5 arrangement. The output transformer of the present arrangement conveniently utilizes a large toroidal ring type of saturable core upon which the output winding 23 is first wound and insulated to withstand the end-to-end primary circuit voltage. The operation of each inverter module or section of the present inverter arrangement is that described previously in relation to FIGS. 1 and 5 and will not be repeated.

FIG. 8 is the circuit arrangement of multiple-modular inverter embodying the present invention in a form suitable for generating two 90° phase displaced output alternating voltages, thus providing a two phase inverted. The present arrangement utilizes two inverter modules electrically connected in parallel and sharing the condensers 12 and 13 in common, the circuit components of one such module having components identified by the same reference numerals as used in FIGS. 1 and 5 while corresponding components of the second inverter module are identified by the same reference numerals printed. In the present arrangement, the frequency of self oscillation of the first inverter module is adjusted to a desired value by adjustment of a resistor 45 included in series between the energizing winding 24 and the juncture point 26. Adjustment of the value of resistance of the resistor 45 varies the voltage impressed upon the energizing winding 24 of the transformer 22 and thereby, by control of the volt-second characteristic of the saturable core of the transformer, effects an adjustment of the inverter self oscillatory frequency for reasons explained above in connection with FIG. 1 and in relation to FIGS. 2, 3 and 4. The energizing winding 24 is provided with a tap 46 at a point corresponding to one fifth of the number of turns of the winding 24, and one end of the energizing winding 24' of the second inverter module is connected to the tap 46 as shown. The voltage developed between the juncture point 25 and the tap 46 of the winding 24 thus is placed in series with the energizing winding 24' of the second inverter module, and for the tap location described and the same transformer construction causes the voltage developed at the juncture point 26' of the second module to be 90° phase displaced with respect to the voltage development at the juncture point 26 of the first module. A range of phase adjustments is available if desired by provision of an adjustable resistor included in series with one end of the energizing winding 24' and the juncture point 26' as shown. By way of illustrating the utility of the present inverter arrangement, it is shown as energizing a two phase motor 46 having a winding 47 connected between the juncture points 25 and 26 and a quadrature winding 48 connected between the juncture points 25 and 26' to develop quadrature related magnetic fields which rotate a motor armature 49 in conventional manner.

FIG. 9 shows a similar two phase inverter having two inverter modules or sections electrically connected in series, the upper module being of the FIG. 5 configuration and the lower module of the FIG. 1 configuration. The transformer 22 of the upper module is provided with a winding 50 which is connected between the junction point 25 and one terminal of the energizing winding 24 of the transformer 22 of the lower module to synchronize the operation of the lower module as explained in connection with FIG. 8. Each module also includes an adjustable resistor 45 connected between the energizing winding 24 and the junction point 26, the resistor 45 of the upper module adjusting the self oscillatory frequency of the inverter and the adjustable resistor 45 of the lower module adjusting the phase of the alternating voltage developed between its junction points 25 and 26 with respect to the alternating voltage developed between the corresponding junction points 25 and 26 of the upper module. The operation of this inverter arrangement is the same as that described in relation to FIG. 8, the two inverter modules generating output alternating voltages having 90° phase displacements suitable for energizing a two phase motor 46 as shown.

FIG. 10 is a circuit diagram of a self excited, three phase, non-phase-ambiguous inverter embodying the present invention. This inverter uses three inverter modules or sections electrically in parallel of which the first is like that previously described in connection with FIG. 1, and corresponding circuit components are identified by corresponding reference numerals. This inverter module uses the frequency adjustable resistor 45 to adjust the self oscillatory inverter frequency as explained in connection with FIG. 8, and its saturable core transformer 22 includes two additional synchronizing windings 54 and 55 which are used in a manner presently to be explained to synchronize the operation of the two additional inverters. The second of these inverter modules is essentially similar to the first inverter module, and corresponding components are identified by similar reference numerals primed, its saturable core transformer 22' likewise including a synchronizing winding 56. The third inverter module also is essentially similar to the first inverter module, and corresponding components are identified by the same reference numerals double primed, its saturable core output transformer 22" likewise including a synchronizing winding 57. The energizing windings 24, 24' and 24" of the respective saturable core transformers 22, 22' and 22" are indicated on the drawing as having the same numbers of turns $N_p$, and each of the synchronizing windings 54, 55, 56 and 57 has one-tenth the number of turns as does its associated energizing winding. The energizing winding 24' of the second inverter module is connected between the junction point 25 of the first inverter module and in series arrangement with the synchronizing winding 57 of the third inverter module, the synchronizing winding 54 of the first inverter module, and the adjustable resistor 45' to its own junction point 26'. Similarly, the energizing winding 24" of the third inverter module is connected between the junction point 25 of the first inverter module and in series arrangement with the synchronizing winding 55 of the first inverter module, the winding 56 of the second inverter module, and its adjustable resistor 45" to its junction point 26".

By inspection of the phase diagram shown in FIG. 11, it will be seen that the 90° voltage required to synchronize the third inverter module is derived from one-tenth of the voltage $E_1$ developed at the junction point 26 of the first inverter module minus one-tenth of the voltage $E_2$ developed at the juncture point 26' of the second inverter module, and similarly that the 90° voltage required to synchronize the second inverter module is derived from one-tenth of the voltage $E_3$ developed at the juncture point 26" of the third inverter module minus one-tenth of the voltage $E_1$ developed at the juncture point 26 of the first inverter module. The voltages thus developed at the junction points 26, 26' and 26" have a 120° phase displacement with respect to each other, the frequency of the developed voltages being controlled by adjustment of the resistor 45 of the first inverter module and the 120° phase relationships being adjustable by adjustment of the resistors 45' and 45" of the second and third inverter modules. In this arrangement, each of the currents of the condensers 12 and 13 is of square wave form and is equal to one-half the energizing current in any one of the transformers 22, 22' or 22" (magnetizing current in addition to reflected base load current) at three times the inverter frequency. Three-phase motors and delta connected three-phase transformers may be energized by direct connection to the junction points 26, 26' and 26", each output voltage $(E_1-E_2)$, $(E_2-E_3)$ and $(E_3-E_1)$ having a quasi-square-wave form of amplitude equal to the amplitude of the input energizing voltage $E_0$ for two-thirds of a half-cycle and having zero amplitude for one-third of the half cycle.

While specific forms of the invention have been described for purposes of illustration, it is contemplated that numerous changes may be made without departing from the spirit of the invention.

What is claimed is:

A direct-current to alternating-current inverter comprising an input circuit for energization with unidirectional power, at least one pair of condensers serially connected across said input circuit, at least one pair of unidirectionally conductive conductance-control devices having conductance terminals serially connected with like directions of conductivity across said input circuit and each including conductance-control terminals, a saturable core output transformer providing an alternating-current output circuit and having an energizing winding connected between the juncture of said condensers and the juncture of said control devices, means including a pair of control windings on said transformer for energizing the control terminals of said devices by oppositely phased control currents to effect energization of said energizing winding with alternating current supplied from said input circuit alternately through said devices, a pair of rectifier devices serially connected with like directions of conductivity but with non-conductive polarities across said input circuit, and a further winding on said transformer connected between the juncture of said rectifier devices and the juncture of said condensers with a winding polarity effective to maintain substantial equality between the terminal voltages of said condensers.

References Cited by the Examiner

UNITED STATES PATENTS

| 2,247,057 | 6/41 | Hull | 331—113 |
| 2,970,301 | 1/61 | Rochelle | 331—113 |
| 3,046,495 | 7/62 | Farries et al. | 331—113 |
| 3,047,789 | 7/62 | Lowry | 331—113 |
| 3,120,633 | 2/64 | Genuit | 331—113 |

FOREIGN PATENTS

| 867,775 | 1/61 | Great Britain. |
| 1,230,467 | 4/60 | France. |

ROY LAKE, *Primary Examiner*.

JOHN KOMINSKI, *Examiner*.